(12) United States Patent
Kahn

(10) Patent No.: US 8,046,364 B2
(45) Date of Patent: Oct. 25, 2011

(54) COMPUTER AIDED VALIDATION OF PATENT DISCLOSURES

(75) Inventor: Michael Robert Kahn, Westampton, NJ (US)

(73) Assignee: Veripat, LLC, Mount Holly, NJ (US)

( * ) Notice: Subject to any disclaimer, the term of this patent is extended or adjusted under 35 U.S.C. 154(b) by 651 days.

(21) Appl. No.: 11/949,039

(22) Filed: Dec. 2, 2007

(65) Prior Publication Data
US 2008/0147656 A1 Jun. 19, 2008

Related U.S. Application Data

(60) Provisional application No. 60/870,602, filed on Dec. 18, 2006, provisional application No. 60/957,703, filed on Aug. 23, 2007.

(51) Int. Cl.
*G06F 17/30* (2006.01)

(52) U.S. Cl. .......................... 707/739; 707/923; 704/10

(58) Field of Classification Search .................. 707/739, 707/687, 999.006, 923, 925–926, 929–932, 707/937, 942; 715/256, 200, 202, 204, 208, 715/257, 259, 260, 731; 704/9, 10, 6, 7
See application file for complete search history.

(56) References Cited

U.S. PATENT DOCUMENTS

| | | | | |
|---|---|---|---|---|
| 6,038,561 | A | * | 3/2000 | Snyder et al. ........................ 1/1 |
| 7,254,530 | B2 | * | 8/2007 | Klavans et al. ................. 704/10 |
| 2006/0190807 | A1 | | 8/2006 | Tran |
| 2007/0150260 | A1 | * | 6/2007 | Lee et al. ........................ 704/2 |

* cited by examiner

*Primary Examiner* — Greta Robinson

(57) ABSTRACT

A method and system for analyzing a patent disclosure is disclosed. The method and system comprise a disclosure analysis and a separate claims analysis, such that each analysis may be performed independently. Missing and incorrect reference labels are identified within the disclosure. Antecedent basis and specification support are checked for the claim elements. Terms within the specification that do not have a reference number, but may require one, are identified, provided that they fit the profile of one of a set of particular lexical patterns.

9 Claims, 10 Drawing Sheets

COMPUTER AIDED VALIDATION OF PATENT DISCLOSURES

CROSS REFERENCE TO RELATED APPLICATIONS

This application claims benefit to U.S. Provisional Application Ser. No. 60/870,602, filed on Dec. 18, 2006, and U.S. Provisional Application Ser. No. 60/957,703, filed on Aug. 23, 2007, the disclosures of which are incorporated herein by reference in their entirety.

FIELD OF THE INVENTION

The present invention relates to computerized analysis of patent disclosures. More particularly, the present invention relates to methods and apparatus for checking important details of the specification and claims of a patent disclosure.

BACKGROUND

Writing a patent disclosure requires a lot of attention to detail. There are various opportunities for mistakes that cannot be identified with a traditional "spellchecker." For example, in many cases, a word can be inadvertently misspelled as another valid word. Hence a spellchecker will not catch that. For example, if you misspell the word "tool" as "toll," a spellchecker will not usually identify that error. These misspellings can often be identified from the context. However, when identifying elements of an invention in a patent disclosure, great care must be taken, since these terms may be subject to intense legal scrutiny if the patent should ever be involved in a court proceeding. In the aforementioned example of "tool" vs. "toll", it may be possible to identify what is meant by the context. However, consider the case of typing "sulfite," when what is meant is "sulfate." Here, both terms are valid words, and refer to different chemical compounds. This is an example of a "typographical" error having potential legal repercussions. In addition to typographical mistakes, there are issues of proper support of claimed subject matter in the written description, and proper form of the claims in terms of claim numbering and antecedents. Even if these mistakes do not have any legal consequences, clients expect high quality from patent practitioners, and any mistakes may reflect badly upon the practitioner and/or firm. Therefore, what is desired is a system and method for computer aided validation of patent disclosures, to aid in prevention of filing patent applications that contain such mistakes.

SUMMARY OF THE INVENTION

The present invention provides important advantages for a patent practitioner. A first advantage is the feature of analyzing a written disclosure, and identifying terms that should have a reference label. This is helpful in the case where an inventor has created a detailed written description, but did not include reference labels for the various parts.

Another advantage provided by the invention is the feature of analyzing a written disclosure, and automatically generating a dictionary containing a list of terms, and the associated reference label for each term. The dictionary is then automatically checked to flag duplicate occurrences, and notify the user, so that those dictionary terms may be verified.

Another advantage provided by the invention is the feature of analyzing the claims associated with a written disclosure, and automatically generating a list of claim elements. The claim elements list is then is then automatically checked to flag any terms that do not appear to have antecedent basis in the claims, and notify the user, so that those claim elements may be verified.

Another advantage provided by the invention is the feature of analyzing the claims associated with a written disclosure, and automatically generating a list of claim elements. The claim elements list is then is then automatically checked to flag any terms that do not appear within the written description, and notify the user, so that those claim elements may be verified, and proper support within the specification of the disclosure for each claim may be verified.

BRIEF DESCRIPTION OF THE DRAWINGS

In the drawings accompanying the description that follows, in some cases both reference numerals and legends (labels, text descriptions) may be used to identify elements. If legends are provided, they are intended merely as an aid to the reader, and should not in any way be interpreted as limiting.

DETAILED DESCRIPTION

Figure 1:
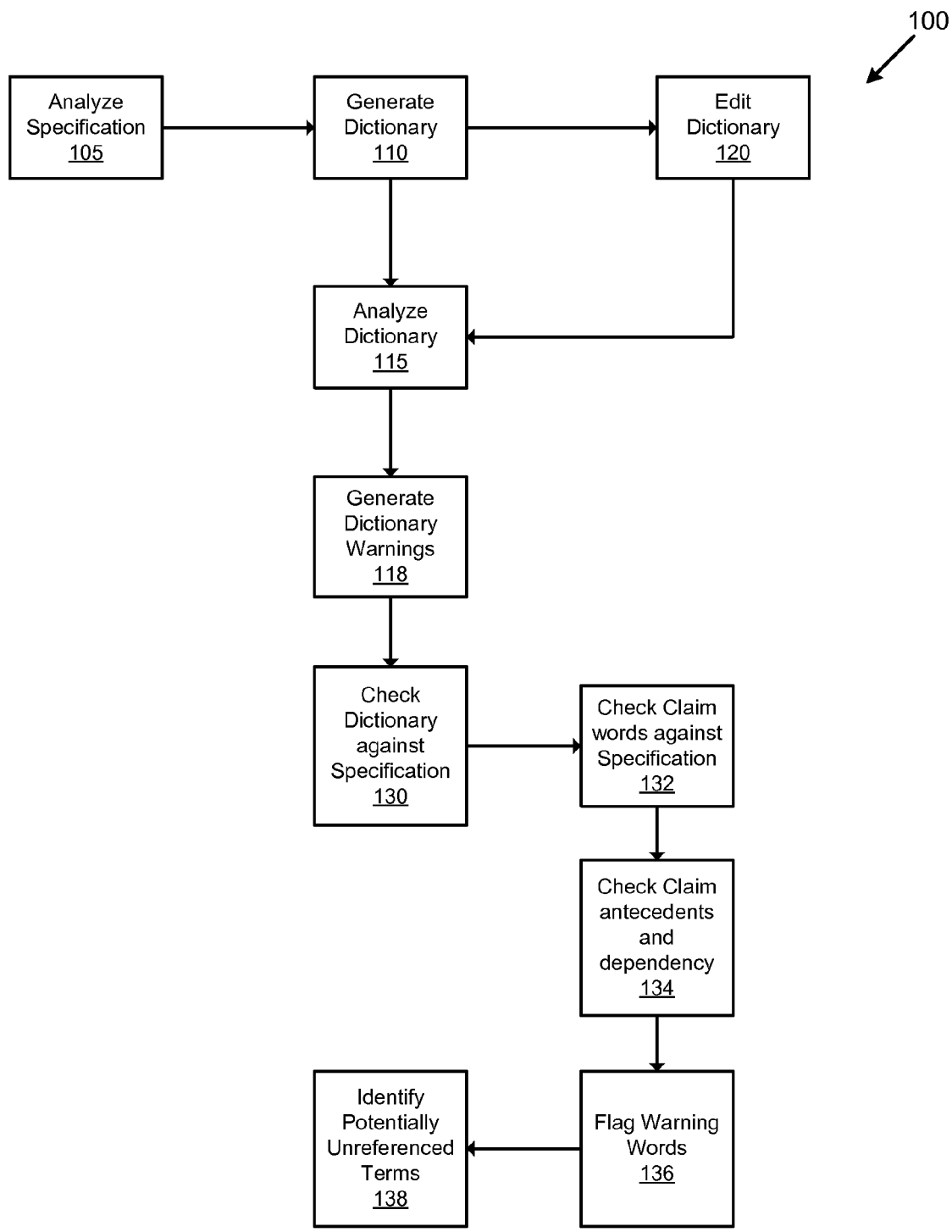
FIG. 1 shows a high level flow diagram of a preferred method of using the present invention

FIG. 1 shows a high level flow diagram 100 of a preferred method of using the present invention. In step 105, a specification (written description of an invention) is analyzed. Preferably, the specification file contains only a "detailed description" portion, with terms and corresponding labels following in the text. However, it is possible to practice the present invention using a full specification that includes the background, abstract, and other sections. However, the primary motivation of the tool is to assist in validating the detailed description. Hence, the results of the tools disclosed herein will be more relevant, if all of the text to be analyzed is relevant as well. In step 110 a dictionary is generated. The dictionary contains reference terms, followed by their corresponding labels. These terms and labels are automatically extracted by parsing the specification.

It is possible that the dictionary that is automatically generated in step 105 contains some terms that should not be included in the dictionary, and may not include some that should be there. This can happen if the wording of the specification is unconventional, causing the terms to be misidentified during the automatic process. In step 120, the user is given the opportunity to edit the dictionary, adding and removing terms as they deem appropriate.

In step 115, the dictionary is analyzed, and any duplication of terms or labels results in a warning being issued for those terms and labels in step 118. The user may then repeat steps 120 and 115 as often as necessary, until the dictionary represents the complete list of terms and labels used in the specification. Alternatively, the user may skip the automatic dictionary generation step of 110, and provide their own dictionary that was generated from other means. For example, the user may compile a list of terms and labels in a spreadsheet as they write the specification. They can then import the data from the spreadsheet to a file that can be read by the various processes within a system of the present invention. It is a matter of preference, and there is no "right" or "wrong" way to obtain a dictionary file. Regardless of how the dictionary file is created, once it has been created, it is compared to the specification in step 130. This comparison comprises identifying terms in the specification, and the label that follows in the specification. The term is then looked up in the dictionary, and the list of labels used to refer to that term is retrieved. This list is compared with the label found in the specification. If there is no match, then a warning is generated and presented to the user, indicating that an incorrect or missing label may exist for the term.

In step 132, the claims are examined, and a list of words appearing in the claims is generated. This list is checked against the specification. Any word in the list that is not found generates a warning to the user. This alerts the user that a particular word found in the claim is not present in the detailed description. The user can then verify if the word used in the claim has been sufficiently defined in the application. As patents are legal documents, claim terms can be highly scrutinized should a patent undergo a legal test (e.g. in the CAFC court). Therefore, it is worthwhile for a patentee (or his/her practitioner) to conduct this analysis. The claim words may optionally be checked against the dictionary, to further qualify words in the claims that are not part of the dictionary. The user can then make a judgment if additional dictionary terms are appropriate. For example, if analysis revealed that the word "bracket" was in the claims, but not in the dictionary, then the user may review the claim, determine that "bracket" is an essential element of the claim, and should be clearly defined in specification with a label, and shown in drawings as appropriate. An issue that sometimes happens is that terms may be described by various words, and for a patent application, it is desired to be consistent. Calling something a "brace" in the specification and a "bracket" in the claims is often undesirable. The system and method of the present invention can aid in identifying these scenarios, and bring them to the attention of the user.

In step 134, claims are checked for proper dependency, and antecedent basis. Dependent claims are identified, and claim terms are associated with a claim number. The present invention identifies "intro" terms and "stated" terms. Intro terms are those that are introduced with an indefinite article (such as 'A' or 'An'). Stated terms are introduced with a definite article (such as 'the' or 'said'). Stated terms within a claim are checked to see if they match a previously cited intro term. If no matching intro term is found, then a warning is generated to the user. The parent claim number is also checked to verify that it is a claim within the application, and that the claim numbering of the parent claim is lower than that of the claim. This can help catch a transposition error, such as writing the phrase "0.13. The method of claim 21 . . . " instead of: "13. The method of claim 12 . . . "

In step 136, warning words are identified to the user. These are words that tend to have limiting meanings, such as "must." While these words may be appropriate in a patent application, caution is required when using limiting words to make sure that the invention is not being described in a too narrow scope. The user can then examine the instances of these words to verify that they are appropriate for the given context.

In step 138, potentially unreferenced terms are identified and presented to the user. This is accomplished by performing a linguistic analysis, looking for specific patterns that tend to be use when elements of an invention are stated. Phrases matching these patterns are identified, and the term from within these patterns is copied to a list of potential terms. Each item in the list of potential terms is checked against the dictionary. If there is a match found, then no warning is generated. If a match is not found, then this word is presented to the user and identified as a potentially unreferenced term. The user can then verify if the identified words should be referenced with reference numbers, and update the dictionary as needed.

Figure 2:
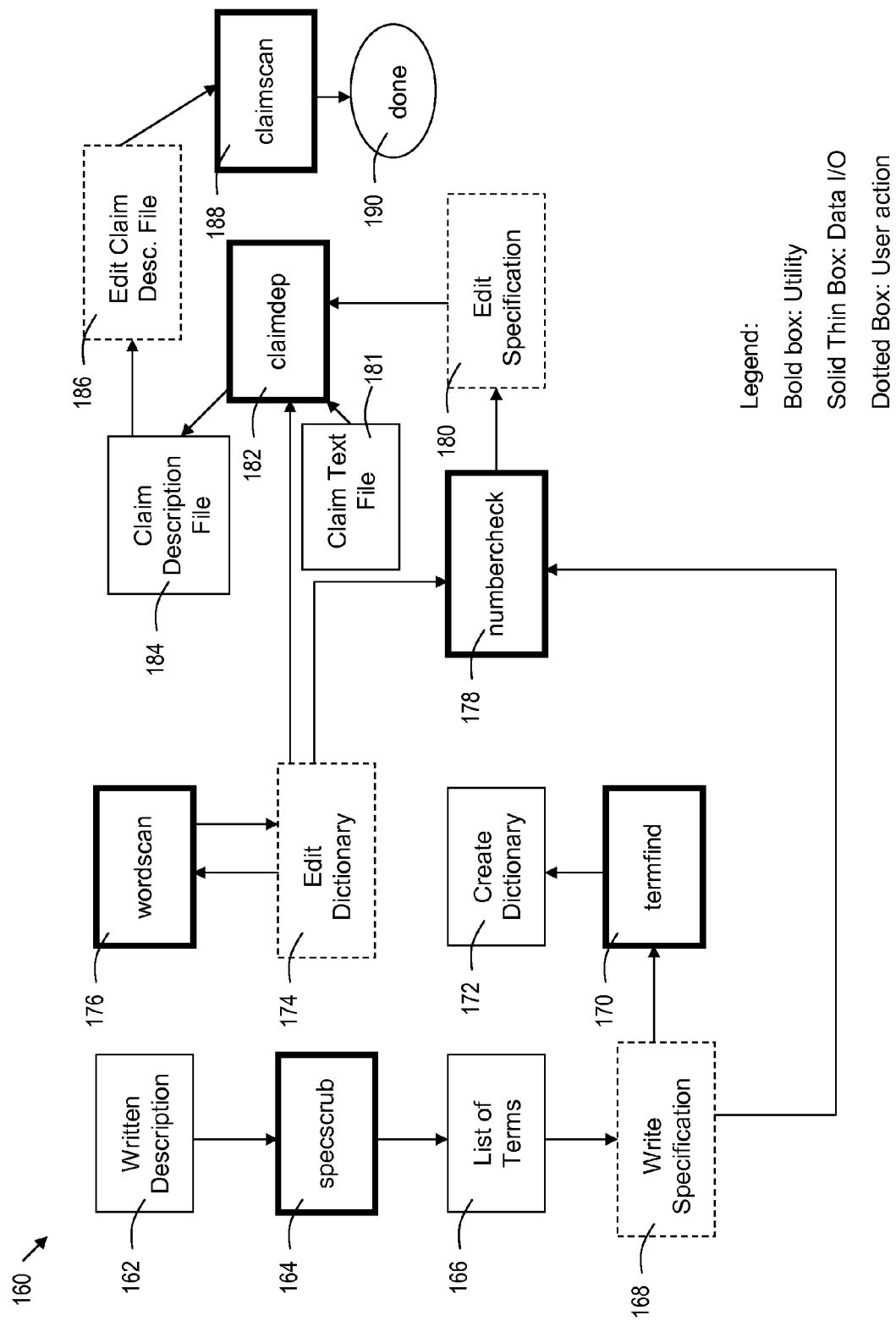
FIG. 2 is a block diagram showing the various processes and associated input/output data for an embodiment of the system of the present invention.

FIG. 2 is a block diagram showing the various processes and associated input/output data for an embodiment of the system 160 of the present invention. The system of the present invention may conveniently be implemented on a standard computer having a microprocessor, RAM, ROM, and a user interface (screen, keyboard, mouse, etc . . . ) as is well known in the art. Those skilled in the art will also recognize that the processes about to be described in detail may also be implemented on multiple computers connected via a communications network, without departing from the scope of the present invention.

Written description file 162 is a written description of an invention that does not contain reference labels. In a practical scenario, an inventor may write such a description that may be used by a practitioner as a starting point for writing a formal application. Written description file 162 is input into the specscrub process 164. The specscrub process 164 performs a linguistic analysis of the document, and creates a list of potential reference terms 166. Using list 166 as an aid, a written specification 168 (having reference labels) is created by the user. Specification 168 is input into the termfind process 170. The termfind process 170 analyzes specification 168, and creates dictionary 172. The user modifies dictionary 170, adding and deleting entries as appropriate, and creates an edited dictionary 174. This edited dictionary 174 is input to the wordscan process 176. The wordscan process 176 checks edited dictionary 174 for duplicate terms and labels (reference numbers). This process is optionally repeated as often as desired to get the edited dictionary 174 into a complete state where it contains all the terms of the specification.

The edited dictionary 174 and the specification 168 are input to the numbercheck process 178. The numbercheck process 178 compares terms and labels of the specification 168 with those listed in the edited dictionary 174. Note that it is also possible to use automatically generated dictionary 170 instead of an edited dictionary 174. It is also possible to use a manually made dictionary. Which dictionary is used is merely a matter of user preference. Based on warnings output by the numbercheck process 178, the user makes any desired corrections and creates an edited specification 180.

The edited specification 180, and a claims file 181 are then input to the claimdep process 182. The claimdep process compares the claim words with the words within the specification (and optionally with the words in the dictionary too). The claimdep process 182 builds a claim hierarchy (a relationship between claims and their parent claims) and a list of intro terms and stated terms. These are stored in a claim description file 184 that is created by the claimdep process 182. The claimdep process 182 performs a claim numbering check, and an antecedent basis check, and provides a list of warnings to the user, so that any appropriate corrective action may be taken. The user may edit the claim description file 184, and then reanalyze it as desired with the claimscan process 188. The claimscan process 188 also performs a claim numbering check, and an antecedent basis check, and provides a list of warnings to the user, similar to what occurs in the claimdep process 182. The user can make adjustments to the claims file 181 and claim description file 184 and repeat the claimdep process 182 and/or claimscan process 188 as much as desired until the user is satisfied with the state of the claims file 181.

The above description provides high-level information about the system and method of the present invention. In the following paragraphs, additional details of the various processes are provided.

Figure 3:
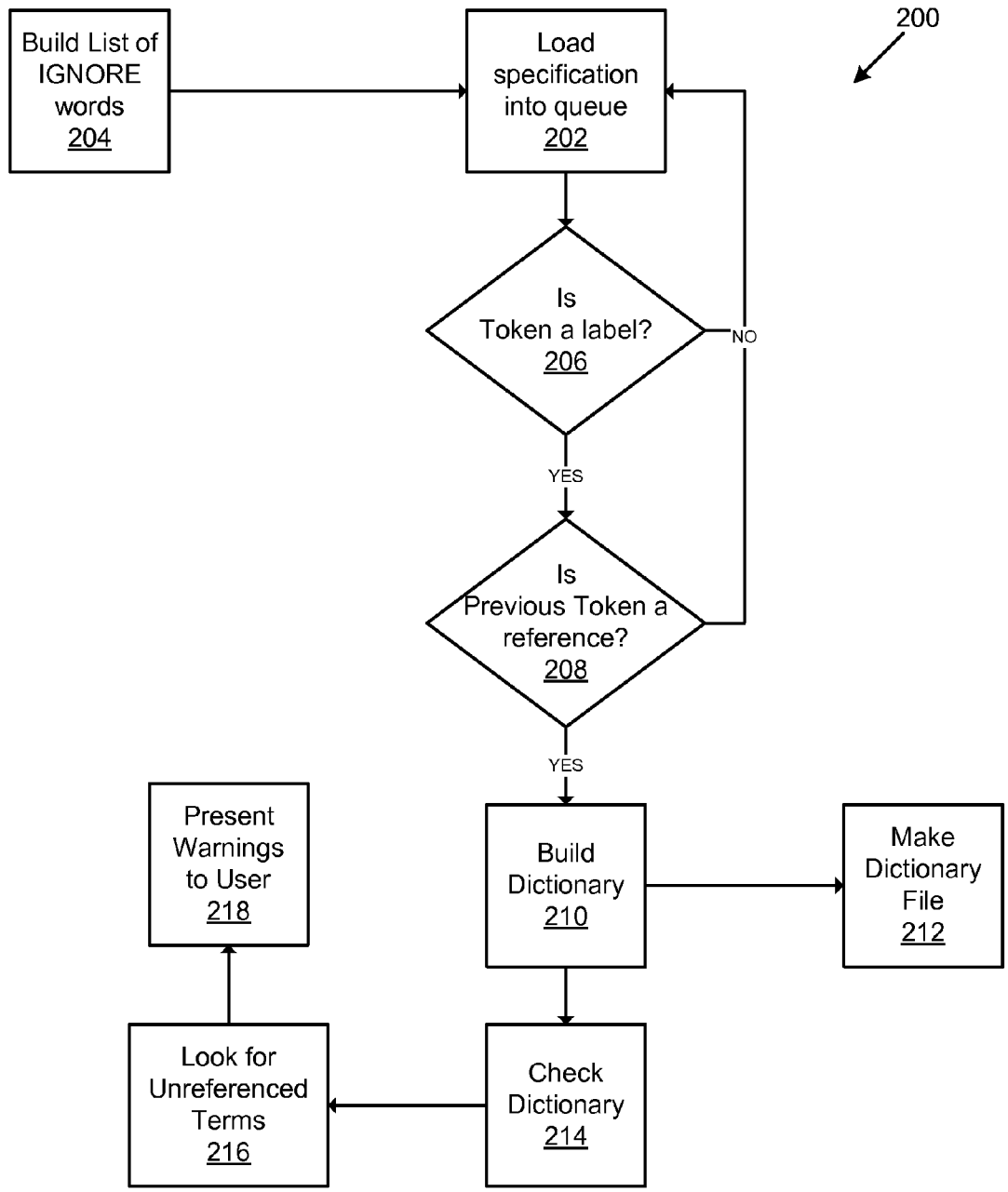
FIGS. 3-8 show process flows for executing the various processes of an embodiment of the system of the present invention.

Termfind:

FIG. 3 shows process flow 200 for executing the termfind process. The termfind process identifies dictionary terms within the disclosure. Dictionary terms are terms which are referred to by a reference label (e.g. hose 23). In step 202, the specification file (preferably containing just the detailed description portion of the specification) is loaded into a queue structure in order to tokenize the disclosure, thereby creating a tokenized patent disclosure. Each grouping of characters in the file is broadly considered to be a token. Tokens can be words, but can also be numbers (e.g. "123", a token containing only numbers is referred to as a numeric token) or alphanumerics (tokens that are combinations of numbers and letters). For example: " . . . part number PXT 34. . . ." In this case, there are three tokens: "part", "number", and the alphanumeric token "PXT 34". Each token will be examined to determine if it is part of a reference of the disclosure being analyzed.

Independent of step 202, in step 204, a list of ignore words is built. The ignore list contains words which will not be considered as a reference, even if a number follows the word.

The ignore list contains words that include the months, and comparative words, such as 'than' and 'since', as well as the prepositions (on, about, below, etc . . . ).

In step 206, reference labels are identified. For the purposes of this disclosure, we refer to "terms" and "labels." A term is a descriptive word used in a patent disclosure, and a label is what is used to refer to that term in a drawing. For example: " . . . a gear 25 connected to a shaft 30 is . . . " In this case, "gear" is a term, and "25" is the label for that term, and shaft is another term, with "30" being the label for "shaft." Each word is examined, starting with the first word in the specification. In step 206, each token is examined to see if it contains numbers. The tokens may be digits (pure numbers, such as "12") or alphanumeric (such as "120A"). In general, a token is referred to as being of type "numeral-containing" if it is a digit or an alphanumeric. If a token T meets any of these criteria, it is considered to be a label.

In step 208, for each label, the preceding token (T−1) is examined to see if it meets the criteria for being considered a term. The preceding token (T−1) is compared to the list of ignore words built in step 204. If token (T−1) is in the ignore list, then token (T−1) is not considered to be a term. If token (T−1) is not in the ignore list, then it is considered to be a term. In step 210, a dictionary is built, containing each term found, and its associated label. In step 212 the dictionary is written to a file, referred to as a dictionary file. The dictionary file is user-editable , and may be reanalyzed after editing.

In step 214 the dictionary file is checked for possible syntax issues. These issues are of two types:
1) Label Warnings: One label referring to multiple terms.
2) Term Warnings: Multiple instances of the same term, referred to by different numbers.

Each syntax issue will generate a warning for the user.

An example of a phrase that would cause a term warning would be, for example, ' . . . having belt 20 and belt 25.' This would cause a warning on the term 'belt.'

An example of a phrase that would cause a label warning would be, for example: ' . . . motors 21 . . . on each motor 21 . . . ' Here the number 21 gets a warning because it refers to both "motors" and "motor." That, of course may be acceptable, but it flags it for the user to evaluate on a case-by-case basis.

In step 216, potentially unreferenced terms are identified. This comprises the steps of first identifying a potential term, and second, checking to see if that term exists in the dictionary that was built in step 210. The step of identifying a potential term involves performing a linguistic analysis on the specification to identify various patterns, looking for words that do not have a reference number that maybe should have one. This is a method that looks for grammatical patterns that are used to refer to terms. If the word found is not already in the dictionary, it is identified as a 'possible unnumbered' term. For the purposes of this disclosure, an "unnumbered term" is a term that does not have a reference number assigned, but should have one, in order to fully disclose the invention within the disclosure. The user can then verify if the possible unnumbered terms identified should be terms or not. This feature aids the disclosure author in making sure that terms that should have a reference label do in fact have one.

The patterns may include, but are not limited to:

Pattern 1: <prep><article><term><period>

Where <prep> is a preposition, <article> is an article (such as 'a', 'an', 'the'), followed by a token that is punctuated with a period. That token is considered to be a term. An example of this pattern is: " . . . under a strut." In this case, 'strut' would be identified as a potential term. If 'strut' was not in the dictionary built in step 210, then a warning would be generated.

Pattern 2: <be_verb><article><term><punctuation>

Where <be_verb> comprises forms of the verb "to be" such as 'has', 'having', 'is', etc . . .

The phrase terminates with a punctuation token, such as a period or a comma.

An example of this pattern is:
" . . . having a strut." or " . . . has a strut, . . . "

In these cases, the word 'strut' would be identified as a potential term. If 'strut' was not in the dictionary built in step 210, then a warning would be generated.

Pattern 3: <be_verb><article><term><object>

Where <object> is word referring to the object, such as 'that' or 'which'.

An example of this pattern is:
" . . . having a strut that . . . " or " . . . has a strut which . . . "

In these cases, the word 'strut' would be identified as a potential term. If 'strut' was not in the dictionary built in step 210, then a warning would be generated.

A complete list of potentially unreferenced terms is then presented to the user in step 218, along with any term warnings and label warnings that were found in step 214.

Figure 4:
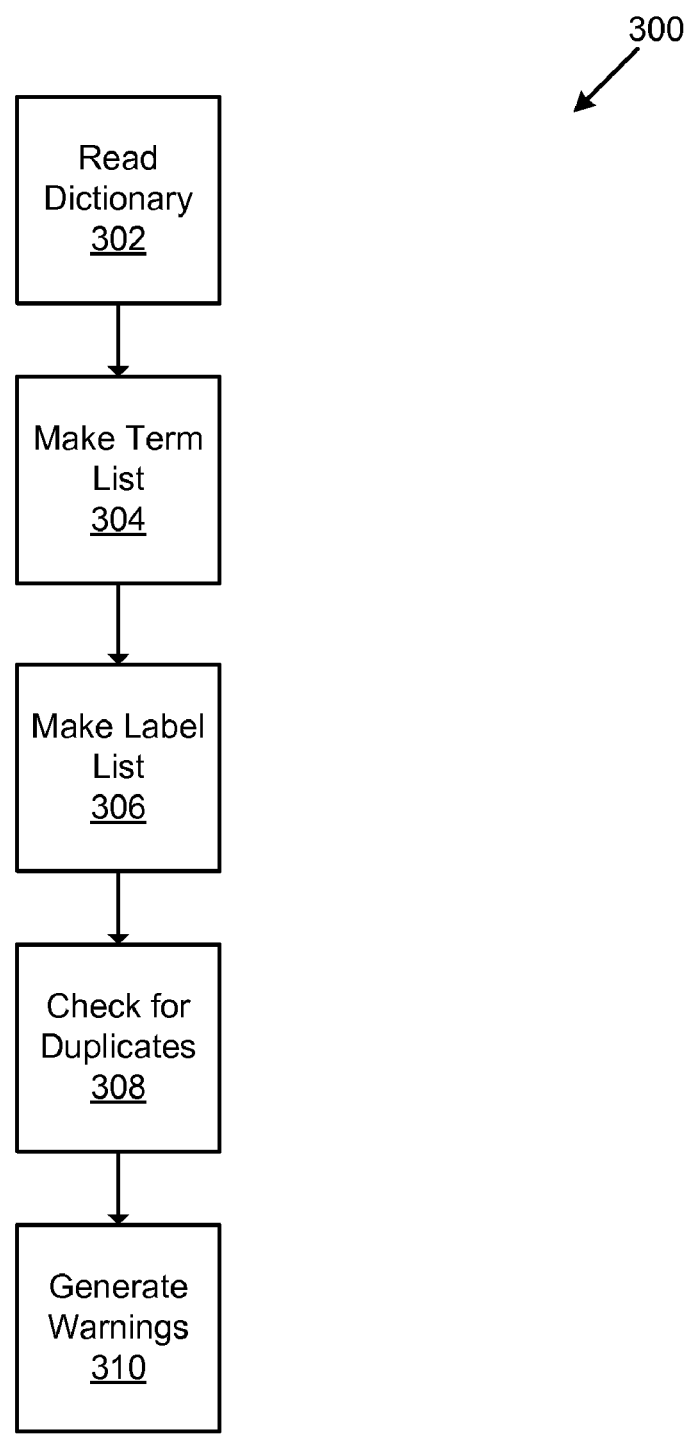

The aforementioned method is preferably implemented in software that executes on a computer. The method comprises the steps of analyzing the tokens surrounding the unnumbered term to determine a token sequence, wherein a token type for each token within the sequence is identified. The software preferably has dictionaries of various token types, so words can be classified accordingly. For example, prepositions are important words for identifying terms. Therefore, it is desirable to have a list of prepositions, verbs, adverbs, adjectives, and articles, so that each token can be associated with a particular token type (e.g. preposition, verb, etc . . . ). Each token sequence is then compared with a collection of predetermined pattern of token types to see if it matches one of those. If it matches one of the patterns, the term is then searched within the term dictionary to determine if the unnumbered term is in the term dictionary. If it is, then this is merely one instance of the use of a term without a number, but the term is numbered elsewhere within the disclosure, since it was found in the dictionary. However, if the term is not found in the dictionary, then it is indicated as an unnumbered term
wordscan FIG. 4 shows process flow 300 for executing the wordscan process. In step 302, the dictionary file is read. In step 304, a list of terms is compiled from the data in the dictionary file. In step 306, a list of labels if compiled from the data in the dictionary file. In step 308, term warnings and label warnings are checked, similar as to what is described in the termfind process (see 200 in FIG. 3).

There are two main scenarios that warrant use of the wordscan process:
1) Edit a dictionary file that was automatically generated via the termfind process, and then perform subsequent analysis on the edited dictionary file.
2) Perform analysis on a manually built dictionary file.

When using the complete set of tools described in this disclosure, then the user will likely be in the first scenario. If the user prefers to make their own dictionary (either manually, or importing a file from a spreadsheet), then they can analyze it using wordscan, without the need for running termfind.

One reason to edit a dictionary file is to fill in compound terms, as well as alphabetical labels (such as ' . . . Force Fw', in which case 'Fw' is an alphabetical label). An example of a compound term is "oxygen tank." When termfind searches the specification, it may find the term "tank." If there is more than one type of tank, then multiple "tanks" may be found.

For an example, suppose a specification contains "oxygen tank 3205" and "nitrogen tank 3210." The automatically generated dictionary may just find the word "tank" having a label of 3205 and 3210, causing a label warning. The user may edit the dictionary to further specify the tanks. The user can then perform another analysis to check for warnings. The previously mentioned label warning is removed, since the tanks are now distinguished by making them compound terms. In another embodiment, the compound terms may be automatically identified by associating the reference number with the token preceding the word "tank." If reference 3210 always referred to a nitrogen tank, then reference 3210 may be is automatically associated with a "nitrogen tank," as opposed to just a "tank."

Numbercheck

Figure 5:
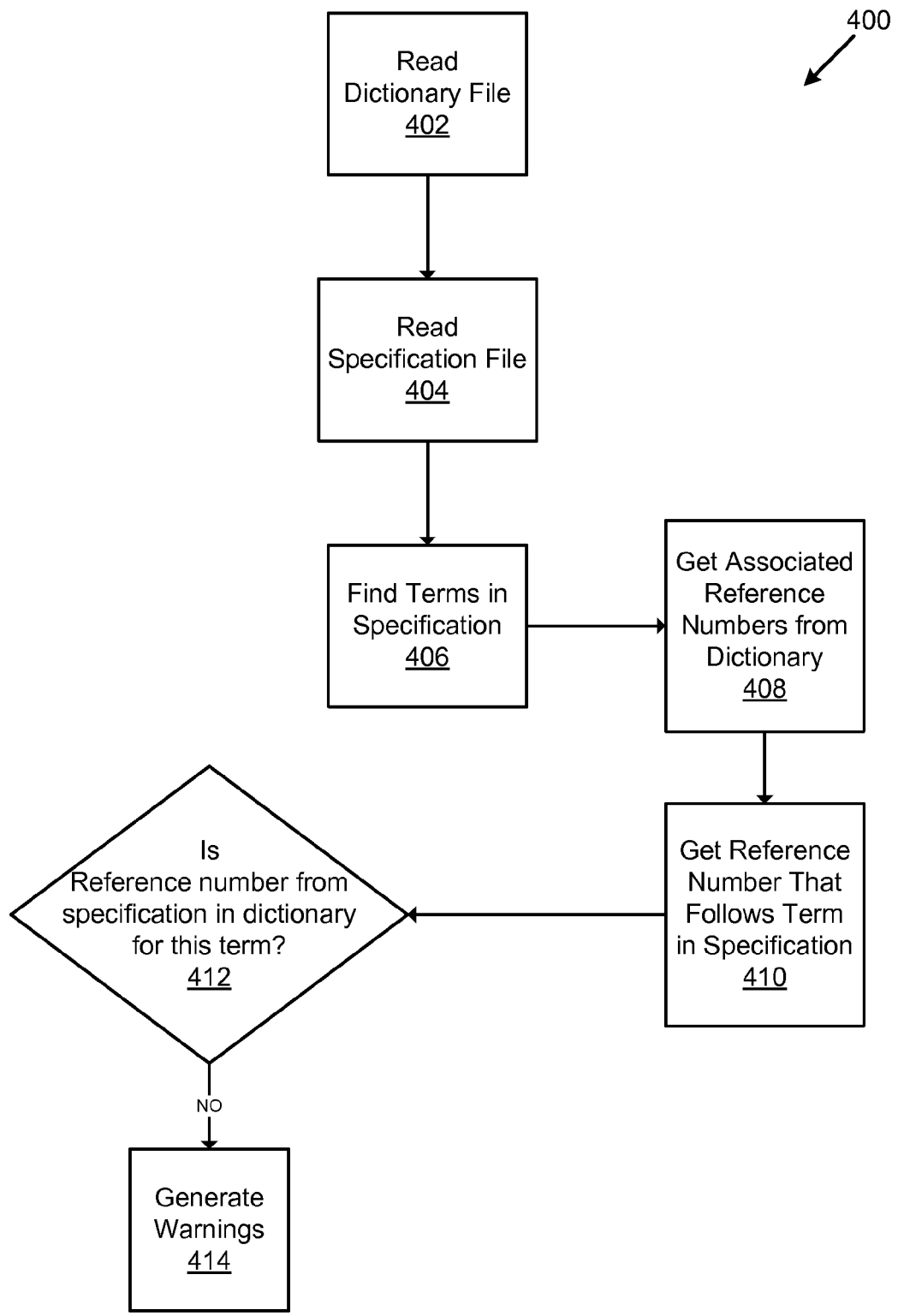

FIG. 5 shows process flow 400 for executing the numbercheck process. In step 402, a dictionary file is read, and a list of terms and labels is created from the data in the dictionary file. In step 404, the specification file (preferably containing a detailed description section) is read. The specification file is examined token by token, to identify terms within it. When a term is found (step 406), the list of labels that correspond to this term are retrieved from the dictionary (step 408).

In step 410, the token following the term that was found (in step 406) is compared to the list of labels obtained in step 408. If the token matches one of the items in the list of labels, then that term is considered to be properly labels. If it does not match, then a label warning is generated.

Looking now at step 406 in more detail, the way multiple word terms are handled is as follows:
1) Form list of tuples, each tuple having a term, and the number of words in the term.
2) sort by number of words, having the largest terms first
3) scan through the list, stopping and returning upon encountering the first exact match.

This approach allows things such as "nitrogen bypass valve 220" to be distinguished from "oxygen bypass valve 225" and "bypass 440". Once a compound term is identified in the specification, the remaining words that are part of that term are skipped (not analyzed to see if they are in the dictionary). Since it is already known that these tokens are part of a compound term, there is no need to analyze them individually.

In addition to generating warnings in step 414, the numbercheck process may optionally create a marked up specification file. This marked up specification file includes proposed corrections or indications the location that prompted a warning to occur. The user can then read the marked up specification to quickly identify any areas requiring attention.

claimdep

Figure 6:
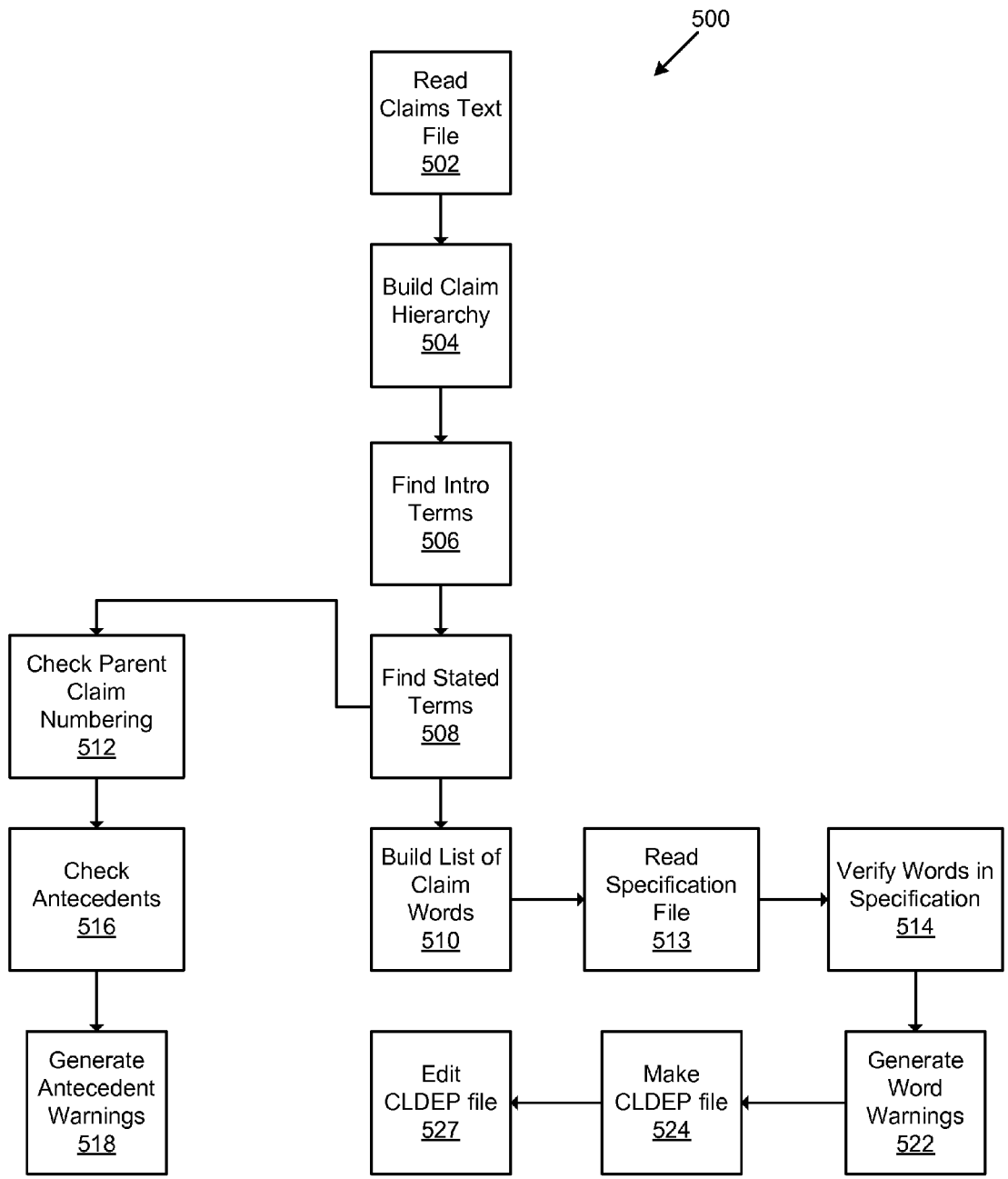

FIG. 6 shows process flow 500 for executing the claimdep process. In step 502, a file containing text of the claims is read. In step 504 a claim hierarchy is built. This entails identifying the number of each claim, and identifying the parent claim, if any.

Identifying a claim entails examining the first token in a line, and looking for the form <number><period>. This pattern is used to identify a new claim. An example is "14. A method for . . . " In this case '14.' is the first token in the line, and signifies the start of claim 14.

When a claim is first identified, it is not yet known if that claim is dependent or independent. A search is conducted for the dependency pattern <claim><number> in the claim. If that pattern is found, an association is made establishing that claim as the parent by storing the current claim and its parent claim as a pair (e.g. within a database record or file). An example phrase having this pattern is: "13. The method of claim 7, . . . ". In this case, claim 13 would be identified has having claim 7 as its parent, and the pair ( 13, 7) is stored to record this relationship. This concept can be extended to support multiple dependent claims.

If a new claim is found without ever finding the dependency pattern, it is assumed to be an independent claim. For sorting purposes, independent claims are represented as depending on claim '0'. This is convenient for performing analysis on the claims to check proper dependency with parent claims. A list of each claim and its immediate parent are compiled. An immediate parent is the closest claim that it depends from. For example, if claim 3 depends on claim 2, and claim 2 depends on claim 1, then the hierarchy can be notated as a list of pairs, as follows:

1,0
2,1
3,2

In this case, claim 2 is the immediate parent of claim 3. Claim 1 is independent, hence it is notated as depending on claim 0.

In addition to identifying the claims and their respective parent claims (thereby forming the claim hierarchy), an automatic identification of claim terms is performed. These terms are used in a subsequent processing step for antecedent checking.

In steps 506 and 508, claim elements are identified by comparing a tokenized claim set to one or more predetermined token patterns. The patterns may include, but are not limited to:

Pattern 1: <prep><article><element><punctuation>

Where <prep> is a preposition, <article> is an article (such as 'a', 'an', 'the'), and <punctuation> is a punctuation token, such as a period, semicolon, or comma. The <element> token is considered to be a claim element. An example of this pattern is:

"... under a strut." In this case, 'strut' would be identified as a claim element.

Pattern 2: <gerund_verb><article><term><punctuation>

Where <gerund_verb> comprises verbs in gerund form such as 'has', 'having', 'comprising', etc . . . , and the <punctuation> token is a punctuation mark.

An example of this pattern is:

"... having a strut." or "... comprising a strut, ..."

In these cases, the word 'strut' would be identified as a claim element.

A term introduced with <article> as an indefinite article (such as 'a' or 'an') is considered as an IntroTerm (intro term). These are identified in step 506.

A term introduced with <article> as a definite article (such as 'the' or 'said') is considered as a StatedTerm (stated term). These are identified in step 508.

The IntroTerms and StatedTerms are stored in a list, associated with the claim in which they were found.

In step 512, the immediate parent of each claim is checked, to verify that no claim depends on itself, a higher numbered claim, or a non-existent claim.

In step 516, each stated term is checked to see if a corresponding intro term in that claim, or an ancestor claim can be found. An ancestor claim is any claim that is above a claim in the hierarchy. For example, if claim 3 depends on claim 2, and claim 2 depends on claim 1, then claim 3 has two ancestor claims (claims 1 and 2). If the stated term is found as an intro term earlier in that claim, or in an ancestor claim, then it is considered to have proper antecedent basis. If an intro term cannot be found, then a warning for that term is generated in step 518.

In addition to checking the numbering (step 512) and antecedents (step 516), a list of claim words is built in step 510. This list includes all the words in the claims (except for specifically ignored words), not just the identified terms. Specifically ignored words include words typical of claim language (such as heretofore, therein, etc . . . ) that are not typically used in a detailed description portion of a patent application.

In step 513, the detailed description that pertains to the claims is read.

In step 514, the claim word list is compared to the detailed description that is read from file in step 513. In step 518, a warning is generated for any words that are not present in the detailed description. This gives the user an opportunity to scrutinize the words used in the claims, and make sure they are properly discussed in the detailed description portion of the disclosure undergoing analysis.

The claim hierarchy, intro terms, and stated terms, are written to a user-editable file (claimdep file) in step 524. This file may be edited if necessary, in step 527. The user may edit the claimdep file to provide multiple word groups describing a single element. This feature is very useful in reducing the number of "false" warnings. For example, suppose a term is introduced in a claim as a "diesel engine." Then, later in that claim, or subsequent claims, the term is referred to as "the engine" or "said engine." Assuming that it is unambiguous and acceptable to refer to the diesel engine as "the engine," it is very useful to have the ability to list both "diesel engine" and "engine" as Intro Terms in the parent claim. In this way, a dependent claim may refer to "the engine" or "the diesel engine" without causing a warning. The computer based analysis that generates the first version of the claimdep file in step 524 greatly simplifies this task, and in some cases, there may be no need to further edit the file, hence, step 527 may be skipped in some cases. However, the ability to edit the claimdep file in step 527, is very powerful. The claim analysis can then be performed on the file that was edited in step 527, to continue the checking process with a reduction in the occurrence of "false" warnings.

claimscan

Figure 7:
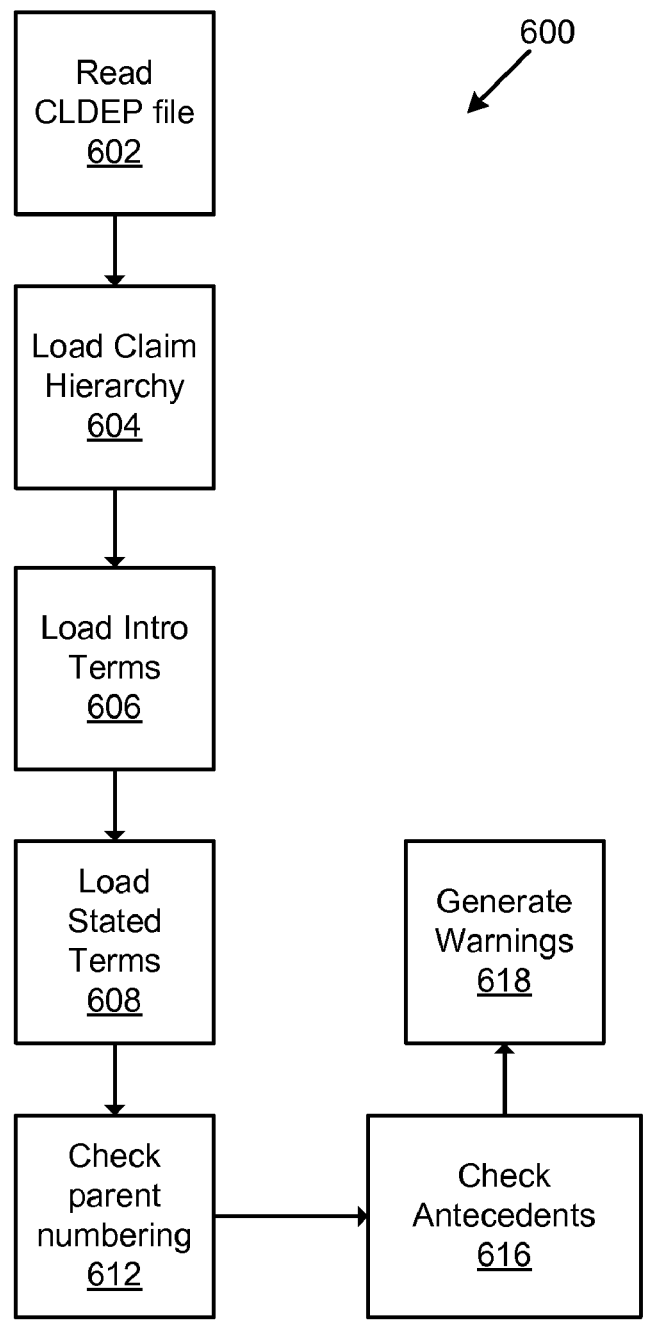

FIG. 7 shows process flow 600 for executing the claimscan process. In step 602, the claimdep file (created in step 524) is read. In step 604, the claim hierarchy is reconstructed from data within the claimdep file. In step 606, intro terms are read from the claimdep file. In step 608, the stated terms are read from the claimdep file. In step 612, the immediate parent of each claim is checked, to verify that no claim depends on itself, a higher numbered claim, or a non-existent claim. This is similar to the processing that occurs in step 512 of the claimdep process.

In step 616, each stated term is checked to see if a corresponding intro term in that claim, or an ancestor claim can be found. This is similar to the processing that occurs in step 516 of the claimdep process. If an intro term cannot be found, then a warning for that term is generated in step 618.

specscrub

Figure 8:
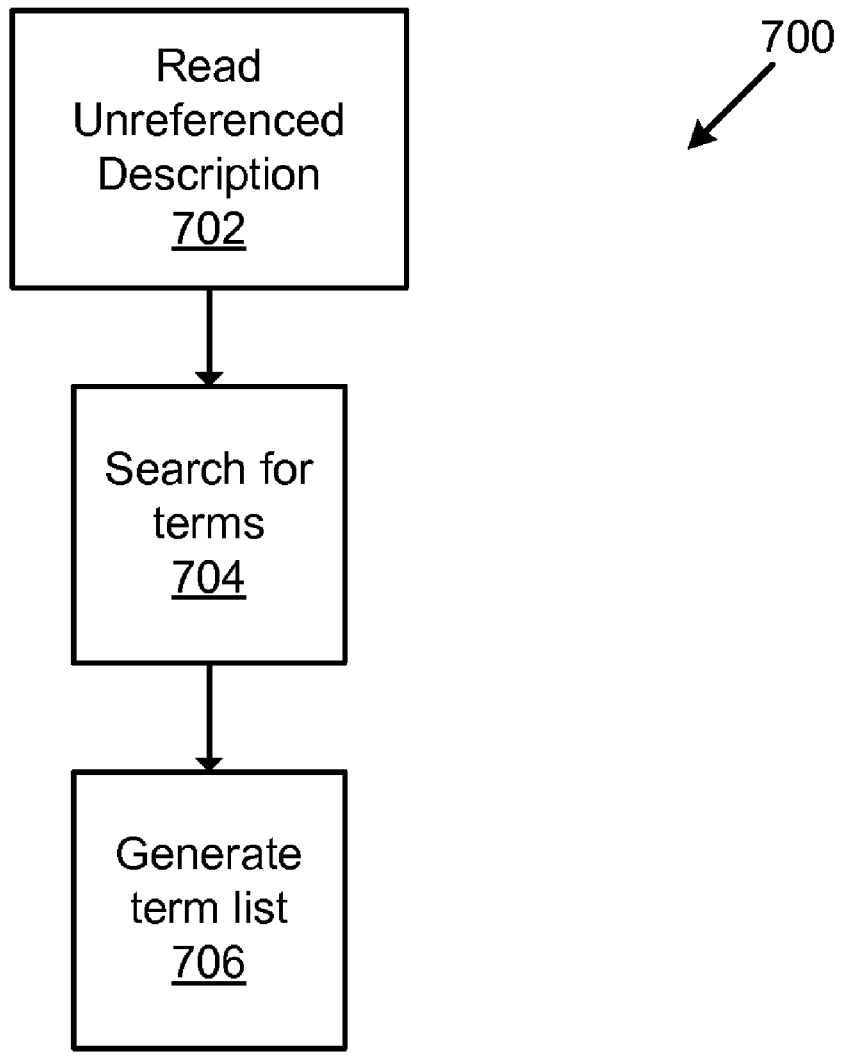

FIG. 8 shows process flow 700 for executing the specscrub process. The specscrub process is indented to be used to analyze a detailed description without reference numbers. In a practical scenario, a client may write a detailed description of their invention that serves as a starting point for writing a patent application. If this detailed description is regular prose (without reference labels), then the specscrub process can be used to aid in identifying reference terms. This type of detailed description is referred to as an unreferenced detailed description.

In step 702 the unreferenced detailed description file is read. In step 702, potential reference terms are identified. This step is similar to that of step 216 in the termfind process. Similar to step 216, in step 702, linguistic analysis is performed on the text to identify various patterns, such as those described for step 216. The difference between step 702 and step 216 is that in step 216, the terms are compared with terms in a dictionary. In step 702, no dictionary exists. In step 706, a list of terms identified is presented to the user. An effective way to use the specscrub process is to first manually identify as many terms as possible. Then compare those terms with the list generated in step 706, and incorporate any additional terms that are deemed necessary.

Figure 9:
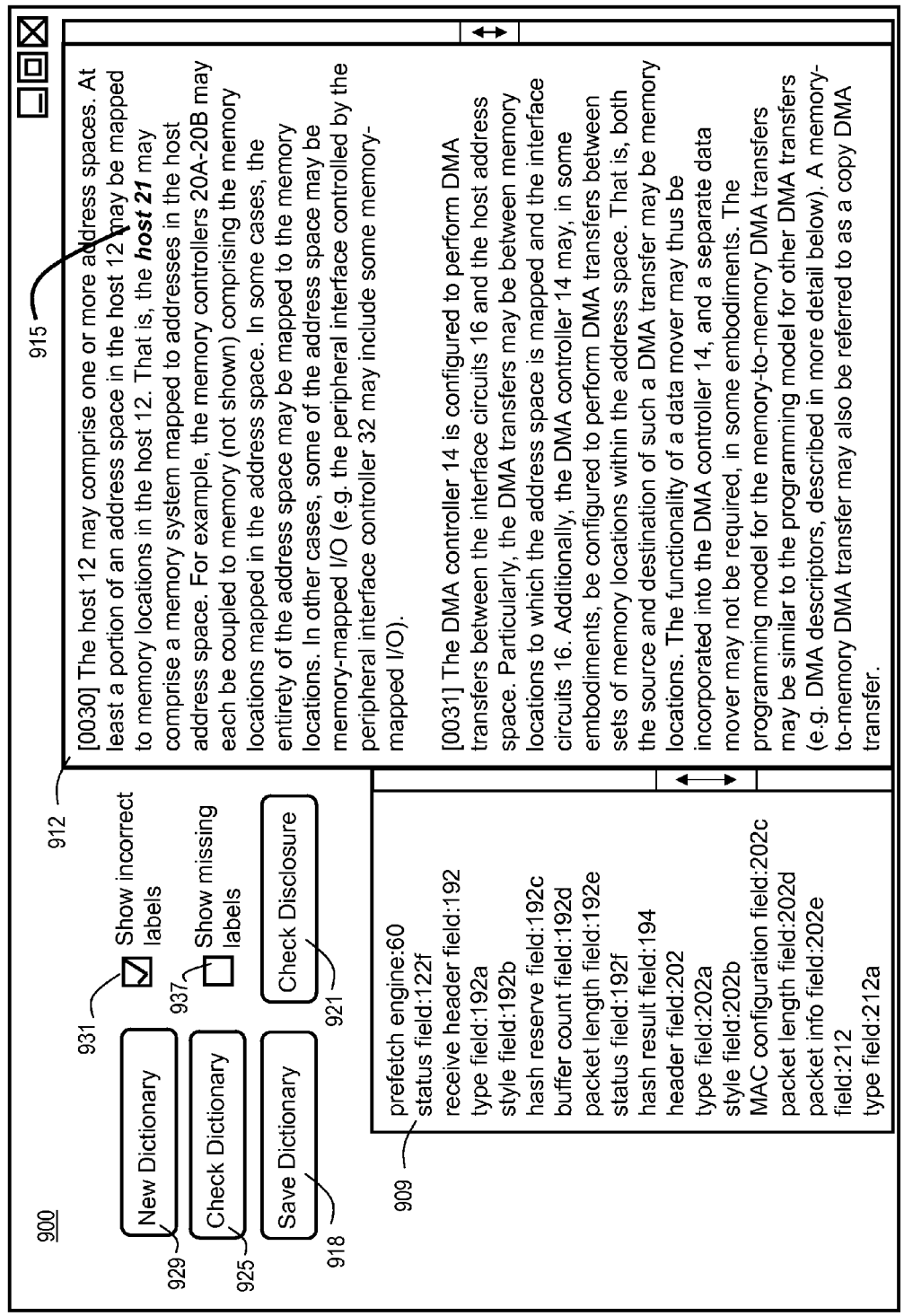
FIG. 9 shows an exemplary user interface for a specification checking software application program in accordance with the present invention.

FIG. 9 shows an exemplary user interface 900 for a specification checking software application program in accordance with the present invention. User interface 900 comprises editable text window 909 that lists a dictionary of terms, and the corresponding reference labels. Text window 912 may be implemented as either editable or non-editable, and displays the specification of the patent application under analysis. Discrepancies found may be indicated via a visual differentiation, such as text in another color, or, as indicated by reference 915, text that is highlighted in bold. In this case, since the term "host" appears in most places within the specification with a reference number of 12. Therefore, the occurrence of "host" with a reference label of "21" is flagged as a possible mistake. User control 929 causes a new dictionary to be generated when invoked. This refreshes the display in window 909. The dictionary can then be edited by directly editing the text in window 909. The edited dictionary can be saved by invoking user control 918. User control 925 invokes a feature to check the dictionary. This feature provides an identification of all terms that are referred to by multiple reference labels, and all reference labels that are used to refer to more than one term. Often, checking the dictionary can catch many mistakes early in the inspection process. User control 921 causes the disclosure to be checked against the dictionary in window 909 when invoked. This causes the text in window 912 to be updated, and any discrepancies are indicated (as in the case with reference 915, where bold italic text is used). Option 931 is shown as invoked in FIG. 9. This option indicates that incorrect labels are to be indicated in window 912. Option 937, shown as not checked in FIG. 9, is used to show missing labels, in which instances of words identified as belonging to the dictionary shown in window 909, that are not followed by a reference label in window 912, will be flagged, and a visual indication will be used to highlight those instances.

Figure 10:
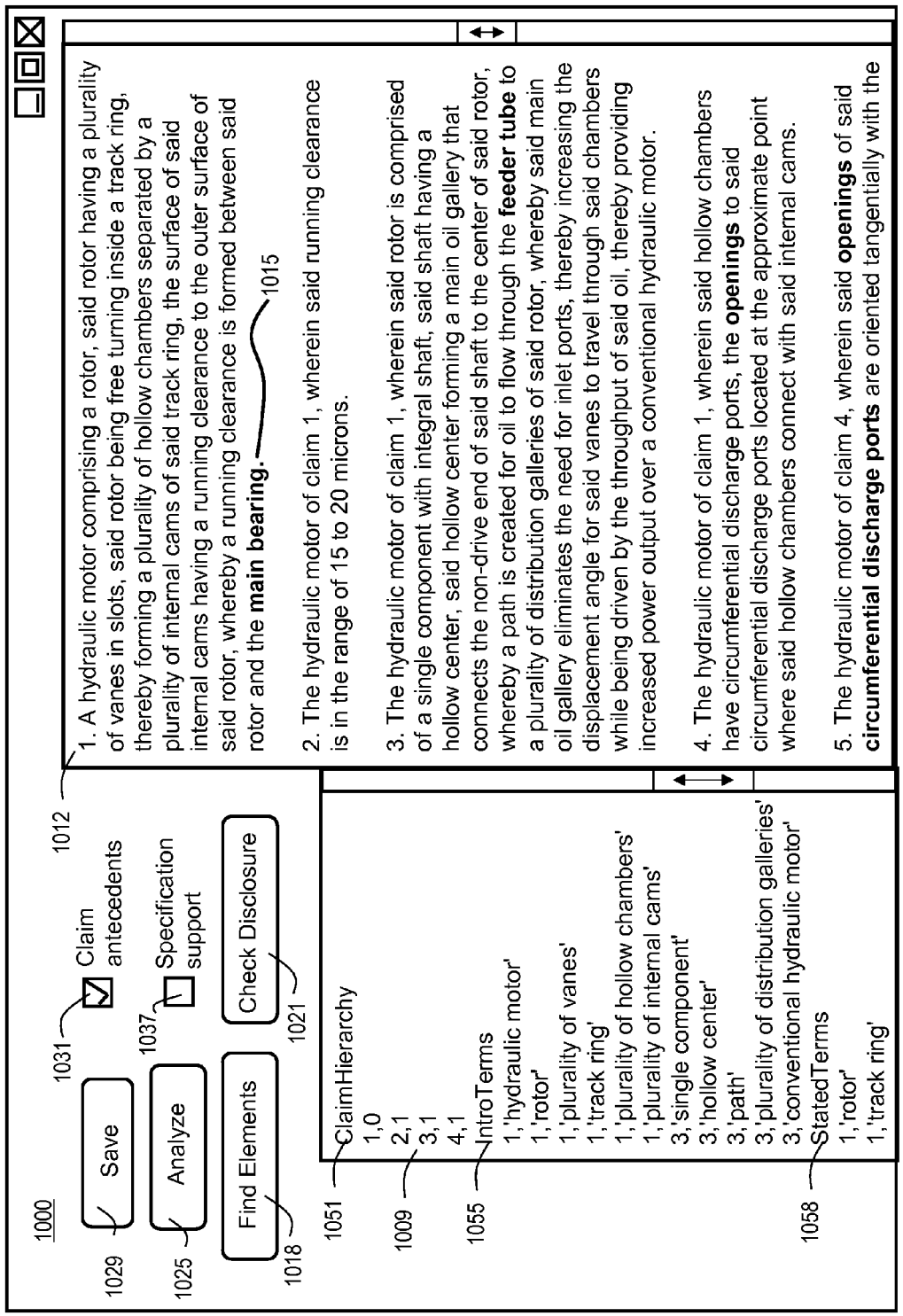
FIG. 10 shows an exemplary user interface for a claims checking software application program in accordance with the present invention.

FIG. 10 shows an exemplary user interface 1000 for a claims checking software application program in accordance with the present invention. User interface 1000 comprises editable text window 1009 that lists claims information that comprises a claim hierarchy section 1051, intro terms section 1055, and stated terms section 1058. Text window 1012 may be implemented as either editable or non-editable, and displays the claims of the patent application under analysis. Discrepancies found may be indicated via a visual differentiation, such as text in another color, or, as indicated by reference 1015, text that is highlighted in bold. In this case, the claim element "main bearing" is first introduced with definite article "the," which causes the element to be flagged as a possible mistake, since it was not previously introduced with an indefinite article. User control 1018 causes a new set of claim elements to be identified when invoked. This refreshes the display in window 1009. The claim hierarchy section 1051, intro terms section 1055, or stated terms section 1058, can then be edited if necessary, by directly editing the text in window 1009. The edited claims information can be saved by invoking user control 1029. User control 1025 invokes a feature to analyze the claims information contained within window 1009. This feature provides an identification of all claim elements that appear to lack antecedent basis within the claims. Often, analyzing the claims information can catch many mistakes early in the claims inspection process. User control 1021 causes the disclosure to be checked against the claims information in window 1009 when invoked. This causes the text in window 1012 to be updated, and any discrepancies are indicated (as in the case with reference 1015, where bold text is used). Option 1031 is shown as invoked in FIG. 10. This option indicates that claim antecedent issues are to be indicated in window 1012. Option 1037, shown as not invoked in FIG. 10, is used to show claim elements which are not found in the specification of the patent application under analysis, indicating a possible issue with lack of support in the specification for that claim element.

As can be appreciated, the above disclosed system and method provide for improved computer aided validation of patent disclosures. The present invention provides an author of a patent disclosure with a powerful set of tools and methods for quickly checking important information within a patent disclosure. In particular, the ability to identify terms that have not been assigned a reference label, yet may be important to the description of the invention is a very useful feature for a disclosure writer and/or practitioner. Furthermore, the ability to edit the claim elements prior to analysis combines the advantages of the speed and processing power of a computerized, automated system, with the benefits of human analysis, that in some cases, can quickly identify contextual issues that purely automated software solutions often miss. The result is a system that can quickly and accurately identify many types of flaws within a patent disclosure.

It will be understood that the present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. A method for identifying a term as unnumbered within a patent disclosure, comprising the steps of:

tokenizing the patent disclosure to form a tokenized patent disclosure comprising a plurality of tokens;

identifying a pattern of tokens comprising a first token immediately followed by a second token, wherein the second token is a numeric token or an alphanumeric token;

comparing the first token to a predetermined list of ignorable tokens;

discarding first tokens that are in the list of ignorable tokens;

making a term dictionary, wherein the term dictionary contains a list of terms, each term comprising a non-discarded first token, and the term dictionary further contains the associated reference label for each term, the associated reference label comprising the second token immediately following the non-discarded first token;

identifying a token type associated with each token within the tokenized patent disclosure;

identifying a token sequence within the tokenized patent disclosure;

comparing the token sequence to determine if the token types of each token within the token sequence matches a predetermined pattern of token types;

searching the term dictionary to determine if the term is in the term dictionary; and indicating the term as an unnumbered term if the term is not in the term dictionary, and the token sequence matches a predetermined pattern;

wherein each of the steps is performed on a computer comprising a microprocessor and non-transitory storage.

2. The method of claim 1, wherein the step of comparing the token sequence to determine if the token sequence matches a predetermined pattern of token types comprises comparing the token sequence to a pattern comprised of a preposition, followed by an article, followed by a term, followed by a period.

3. The method of claim 1, wherein the step of comparing the token sequence to determine if the token sequence matches a predetermined pattern of token types comprises comparing the token sequence to a pattern comprised of a form of the verb 'to be' followed by an article, followed by a term, followed by a punctuation mark.

4. The method of claim 1, wherein the step of comparing the token sequence to determine if the token sequence matches a predetermined pattern of token types comprises comparing the token sequence to a pattern comprised of a form of the verb 'to be' followed by an article, followed by a term, followed by the word 'that' or the word 'which.'

5. A system for computer aided patent inspection, comprising:

means for identifying unnumbered terms within a patent disclosure;

means for generating a dictionary of terms from the patent disclosure, and associated reference labels;

means for editing the dictionary to add, edit, or remove terms; and means for checking numbering of terms in the patent disclosure against the terms in the dictionary; wherein the means for identifying unnumbered terms within a patent disclosure comprises:

means for tokenizing the patent disclosure to a form a tokenized patent disclosure;

means for identifying the token type for each token within the tokenized patent disclosure; and wherein the means for tokenizing the patent disclosure to form a tokenized patent disclosure comprises:

means for identifying a pattern of tokens comprising a first token immediately followed by a second token, wherein the second token is a numeric token or an alphanumeric token;

means for comparing the first token to a predetermined list of ignorable tokens; discarding first tokens that are in the list of ignorable tokens;

means for making a term dictionary, wherein the term dictionary contains a list of terms, each term comprising a non-discarded first token, and the term dictionary further contains the associated reference label for each term, the associated reference label comprising the second token immediately following the non-discarded first token;

wherein each of the means comprises a computer comprising a microprocessor and non-transitory storage.

6. The system of claim 5, further comprising: means for generating a claims hierarchy of a set of numbered patent claims associated with said patent disclosure;

means for editing the claims hierarchy;

means for generating a list of claim intro terms;

means for editing the list of claim intro terms;

means for generating a list of claim stated terms;

means for editing the list of claim stated terms; and means for identifying a stated term that does not have a corresponding intro term previously declared in the patent claims.

7. The system of claim 6, further comprising means for identifying a stated term that is not present in the patent disclosure; and means for identifying an intro term that is not present in the patent disclosure.

8. The system of claim 5, further comprising means for identifying dictionary terms that are associated with more than one reference label.

9. The system of claim 5, further comprising means for identifying reference labels that are associated with more than one dictionary term.

\* \* \* \* \*